United States Patent
Duke, Jr. et al.

(10) Patent No.: US 9,944,763 B2
(45) Date of Patent: Apr. 17, 2018

(54) POLYUREA-URETHANE CORD TREATMENT FOR POWER TRANSMISSION BELT AND BELT

(75) Inventors: Joseph R. Duke, Jr., Elizabethtown, KY (US); John Graeme Knox, Oxford, MI (US)

(73) Assignee: Gates Corporation, Denver, CO (US)

( * ) Notice: Subject to any disclaimer, the term of this patent is extended or adjusted under 35 U.S.C. 154(b) by 943 days.

(21) Appl. No.: 12/628,676

(22) Filed: Dec. 1, 2009

(65) Prior Publication Data
US 2011/0129647 A1   Jun. 2, 2011

(51) Int. Cl.
| | |
|---|---|
| C08J 5/04 | (2006.01) |
| C08G 18/10 | (2006.01) |
| C08G 18/42 | (2006.01) |
| C08G 18/48 | (2006.01) |
| C08G 18/76 | (2006.01) |

(Continued)

(52) U.S. Cl.
CPC .............. *C08J 5/046* (2013.01); *C08G 18/10* (2013.01); *C08G 18/4277* (2013.01); *C08G 18/4854* (2013.01); *C08G 18/7614* (2013.01); *C08J 5/042* (2013.01); *C09J 175/04* (2013.01); *D06M 15/564* (2013.01); *D06M 15/568* (2013.01); *D06M 15/572* (2013.01); *F16G 1/10* (2013.01); *F16G 1/28* (2013.01); *F16G 5/08* (2013.01); *F16G 5/20* (2013.01); *C08J 2375/00* (2013.01); *Y10T 156/10* (2015.01); *Y10T 428/24479* (2015.01); *Y10T 428/249937* (2015.04)

(58) Field of Classification Search
CPC .. C08G 18/10; C08G 18/324; C08G 18/3821; C08G 18/4277; C08G 18/4854; C08G 18/7614; C08J 2375/00; C08J 5/042; C08J 5/046; C09J 175/04; D06M 15/564; D06M 15/568; D06M 15/572; F16G 1/10; F16G 1/28; F16G 5/08; F16G 5/20; Y10T 156/10; Y10T 428/24479; Y10T 428/249937

USPC ................................................... 428/475, 396
See application file for complete search history.

(56) References Cited

U.S. PATENT DOCUMENTS

| | | |
|---|---|---|
| 2,968,575 A | 1/1961 | Mallonee |
| 3,138,962 A | 6/1964 | Haines et al. |

(Continued)

FOREIGN PATENT DOCUMENTS

| | | |
|---|---|---|
| JP | 02-175943 | 7/1990 |
| JP | 03-185139 | 8/1991 |

(Continued)

OTHER PUBLICATIONS

Garth L. Wilkes, "A few highlights of over 35 years of research on elastomeric polyurethanes," Rubber Division Spring 169th Technical Meeting, Akron, OH (May 8-11, 2006).

*Primary Examiner* — Elizabeth M Cole
(74) *Attorney, Agent, or Firm* — Paul N. Dunlap, Esq.; Jeffrey A. Thurnau, Esq.

(57) ABSTRACT

A belt with a tensile cord embedded in an elastomeric body, having a polyurea-urethane adhesive composition impregnating the cord and coating the fibers. The composition is reaction product of a polyurethane prepolymer and a diamine curative or water. The prepolymer is a reaction product of a compact, symmetric diisocyanate and a polyester, polyether, or polycarbonate polyol. The belt body may be of cast polyurethane, vulcanized rubber, or thermoplastic elastomer. The cord may have an adhesive overcoat.

31 Claims, 2 Drawing Sheets

(51) Int. Cl.
| | |
|---|---|
| *C09J 175/04* | (2006.01) |
| *D06M 15/564* | (2006.01) |
| *D06M 15/568* | (2006.01) |
| *D06M 15/572* | (2006.01) |
| *F16G 1/10* | (2006.01) |
| *F16G 1/28* | (2006.01) |
| *F16G 5/08* | (2006.01) |
| *F16G 5/20* | (2006.01) |

(56) References Cited

U.S. PATENT DOCUMENTS

| | | | |
|---|---|---|---|
| 3,228,820 A | | 1/1966 | Samson |
| 3,256,220 A | | 6/1966 | Brotherton et al. |
| 3,349,634 A | | 10/1967 | Terhune et al. |
| 3,726,838 A | | 4/1973 | Eimer et al. |
| 3,962,511 A | * | 6/1976 | Foti ............... 442/206 |
| 4,009,307 A | | 2/1977 | Erikson et al. |
| 4,044,540 A | | 8/1977 | Toki et al. |
| 4,048,001 A | | 9/1977 | Remley |
| 4,153,775 A | | 5/1979 | Winkelmann et al. |
| 4,194,940 A | * | 3/1980 | Damico ............ C09J 175/08 156/166 |
| 4,332,965 A | * | 6/1982 | Dalibor ............ C07C 275/62 528/45 |
| 4,605,571 A | * | 8/1986 | Watanabe et al. ........... 427/387 |
| 4,902,542 A | * | 2/1990 | Minegishi ............... B68G 1/00 428/198 |
| 4,978,409 A | | 12/1990 | Fujiwara et al. |
| 5,171,633 A | * | 12/1992 | Muramoto et al. ........... 428/374 |
| 5,183,877 A | | 2/1993 | Swanson |
| 5,231,159 A | | 7/1993 | Patterson et al. |
| 5,501,879 A | | 3/1996 | Murayama |
| 5,553,366 A | | 9/1996 | Novack |
| 5,653,655 A | | 8/1997 | Onoe et al. |
| 5,703,193 A | | 12/1997 | Rosenberg et al. |
| 5,807,194 A | | 9/1998 | Knutson et al. |
| 6,012,498 A | * | 1/2000 | Koch ............... 152/197 |
| 6,046,297 A | | 4/2000 | Rosenberg et al. |
| 6,174,984 B1 | | 1/2001 | Peter |
| 6,465,104 B1 | | 10/2002 | Krebs et al. |
| 6,598,634 B1 | | 7/2003 | Koch et al. |
| 6,649,727 B1 | | 11/2003 | Anderson et al. |
| 6,695,733 B2 | | 2/2004 | Knutson |
| 6,945,891 B2 | | 9/2005 | Knutson |
| 6,964,626 B1 | | 11/2005 | Wu et al. |
| 8,771,725 B2 | | 7/2014 | Chesson et al. |
| 2003/0065124 A1 | | 4/2003 | Rosenberg et al. |
| 2005/0271874 A1 | | 12/2005 | Sakajiri et al. |
| 2006/0213174 A1 | * | 9/2006 | Wu ............... 57/237 |
| 2009/0142572 A1 | * | 6/2009 | Burlett ............... 428/295.1 |
| 2009/0159206 A1 | | 6/2009 | Wang |
| 2009/0227406 A1 | | 9/2009 | Wu et al. |

FOREIGN PATENT DOCUMENTS

| | | |
|---|---|---|
| JP | 10-002379 | 1/1998 |
| JP | 2002195349 A | 7/2002 |
| JP | 2002-071057 A | 8/2002 |
| JP | 2004114555 A | 4/2004 |
| JP | 2005023480 A2 | 1/2005 |
| JP | 2006089877 | 4/2006 |
| JP | 2007154382 A | 6/2007 |
| JP | 2008-013904 | 1/2008 |
| JP | 2009-24779 A | 2/2009 |
| RU | 2253773 C1 | 6/2005 |
| RU | 2331001 C2 | 8/2008 |
| WO | 1994023771 A1 | 10/1994 |

* cited by examiner

POLYUREA-URETHANE CORD TREATMENT FOR POWER TRANSMISSION BELT AND BELT

BACKGROUND OF THE INVENTION

Field of the Invention

This invention relates generally to a method of treating tensile cord for a power transmission belt, the treatment, the cord and the resulting belt, more particularly to polyurea-urethane-treated carbon fiber reinforcement, and specifically to a carbon fiber cord impregnated with a moisture-cured polyurea-urethane composition.

Description of the Prior Art

U.S. Pat. No. 5,807,194 to Knutson et al., the contents of which are hereby incorporated herein in its entirety, discloses a synchronous power transmission belt with a belt body of cast urethane belt material, belt teeth formed of the body, a wear-resistant fabric reinforcement disposed along peripheral surfaces of the belt teeth, and a tensile member of helically spiraled cord embedded in the belt body and of a yarn of carbon fiber, wherein there are interstices between the fibers of the cord and belt material penetrates at least a portion of the cord interstices as the belt is cast so that the cord interstices contain a minimum of about 0.21 mg of belt material per $mm^3$ of cord volume. Penetration of polyurethane elastomer into the cord may give excellent physical adhesion. However, urethane in its cured state as a high modulus belt material may make a particular cord material unacceptable when it penetrates the interstices of the cord because the so penetrated cord may have an unacceptably high bending modulus. Also, the penetrating urethane may transfer too high a strain to filaments comprising the cord and thus cause unacceptable filament breakage resulting in cord failure. Cast polyurethane materials are often of such a viscosity that it is hard to sufficiently impregnate the cord. Problems from insufficient impregnation include fraying of cord, poor fatigue life, etc.

U.S. Pat. No. 5,231,159 to Patterson et al., the contents of which are hereby incorporated herein in its entirety, describes cast or RIM polyurethane compositions useful for belts. The polyurethanes are based on the reaction product of an isocyanate-terminated (preferably polyether) prepolymer, an amine- or hydroxyl-terminated polyol, and a polyamine or polyol chain extender.

U.S. Pat. No. 6,964,626 to Wu et al., the contents of which are hereby incorporated herein in its entirety, discloses improved polyurethane/urea elastomers having high temperature stability to about 140-150° C. and low temperature flexibility at about −35-(−40)° C., for use in dynamic applications. These elastomers are useful for application in belts, specifically in automotive timing or synchronous belts, V-belts, multi-V-ribbed or micro-ribbed belts, flat belting and the like. The polyurethane/urea elastomers are prepared by reacting polyisocyanate prepolymers with symmetric primary diamine chain extenders, mixtures of symmetric primary diamine chain extenders and secondary diamine chain extenders, or mixtures of symmetric primary diamine chain extenders and non-oxidative polyols, which are all chosen to eliminate the need for catalysts via standard molding processes, and to improve phase separation. The polyisocyanate prepolymers are reaction products of polyols which are nonoxidative at high temperatures, such as polycarbonate polyols, polyester polyols, or mixtures thereof, with organic polyisocyanates which are either compact, symmetric and aromatic, such as para-phenylene diisocyanate, 1,5-naphthalene diisocyanate, and 2,6-toluene diisocyanate, or are aliphatic and possess trans or trans,trans geometric structure, such as trans-1,4-cyclohexane diisocyanate and trans,trans-4,4'-dicyclohexylmethyl diisocyanate.

Prior efforts to treat cord with a softer material to make a more flexible cord in polyurethane belts have resulted in belts with lower torque resistance, higher heat build up during flexing, poor resistance to delamination, and the like. Adhesive treatments for carbon fiber cord in general have been less than adequate for demanding belt applications, whether for polyurethane or rubber belts. Representative of prior carbon fiber adhesive treatments are U.S. Pat. Nos. 6,695,733 and 6,945,891 to Knutson, which disclose a toothed rubber belt with resorcinol-formaldehyde-latex ("RFL") treated carbon fiber tensile cord. Also representative of the carbon fiber adhesive art is the epoxy primer and RFL treatment of U.S. Pat. No. 4,044,540 to Toki et al., and the primer and RFL treatment of U.S. Pat. No. 4,978,409 to Fujiwara et al.

U.S. Pat. Appl. Pub. No. 2005-0271874A1 to Sakajiri et al. discloses carbon fiber sizing treatment with unsaturated urethane compound as the principal component. JP 2005-023480A2 to Sakajiri et al. discloses a resin composition including a polyurethane, an epoxy resin and a crosslinking agent for impregnating a carbon fiber bundle.

U.S. Pat. Pub. No. 2009/0098194A1 describes urea-urethane chemistry.

U.S. Pat. No. 3,962,511 discloses polyurethane compositions for encapsulating textile woven fabric for industrial conveyor belts and a method of applying a polyurethane reaction mixture in an organic solvent solution.

Reference is made to co-pending application Ser. No. 11/947,470 filed on Nov. 29, 2007, and Ser. No. 12/044,957 filed on Mar. 8, 2008, the contents of both of which are hereby incorporated herein in their entireties.

SUMMARY

The present invention is directed to systems and methods which provide flexible, high-modulus tensile cords for reinforcing belts and dynamic rubber articles, including polyurethane power transmission belts and rubber drive belts. The present invention provides a cord with good adhesion and compatibility with polyurethane belt body materials and with improved handling including excellent tensile strength, reduced fraying or fly build up, and durability. Polyurethane belts according the invention have improved flexibility for enduring handling, back bending, and the like, and improved cutting performance. Rubber belts with carbon tensile cords according to the invention exhibit improved performance over conventional RFL-treated carbon cord. The invention is directed to cords with an adhesive treatment that can be applied to a twisted bundle of fibers with good penetration into the bundle.

The present invention is directed to a belt with a tensile cord embedded in an elastomeric belt body with the cord having a polyurea-urethane ("PUU") adhesive treatment. The PUU adhesive may be based on a polyurethane prepolymer, such as a polyester or polyether or polycarbonate, terminated with isocyanate, having been derived from a polyol reacted with a diisocyanate. The polyester may be polycaprolactone. The polyol may be a mixture of diol and triol. The diisocyanate may be a symmetric, compact diisocyanate, such as PPDI, TDI, MDI, and the like. The diisocyanate may not be perfectly symmetric, but preferably is. The adhesive treatment may have a compact, symmetric, diamine curative or may be cured with water, such as environmental moisture. The invention is also directed to the tensile cord and the adhesive composition.

In an embodiment of the invention, the tensile cord may be based on carbon fiber filament yarn, which may be twisted before impregnation with the adhesive. The interstices between the fibers, regardless of fiber type, may be partly or completely filled with the adhesive. The fibers may be coated with the adhesive. The filling may be from 20% to 99% or 100% of the volume of the interstices. Though the fibers may be coated and some interstices filled with adhesive, the coating may be relatively thin and not enough to completely bind all the fibers together. In an embodiment using cast polyurethane for the belt body material, the cast polyurethane may impregnate some or all of the remaining interstices and intimately contact the adhesive coating. Alternately, the cord may have an additional overcoat adhesive.

The invention is also directed to a method including the steps of making an adhesive dip by mixing or dissolving the polyurethane prepolymer in a suitable solvent along with a small or compact, symmetric, diamine curative, dipping a yarn or twisted yarn into the dip, drying off the solvent, and at least partially curing the adhesive. The curative may be water alone which may be available from ambient moisture present in the solvent and/or air. During cure, urea linkages form between isocyanate end groups on the prepolymer molecules. The prepolymer may be linear (two isocyanate ends) or branched (three or more isocyanate end groups) (preferably just two or three or mixtures thereof).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

The present invention is directed to a polyurea-urethane ("PUU") adhesive composition for use on textile fibers, and in particular for preparing treated tensile cord for use in reinforced rubber articles such as belts or hose. The PUU adhesive is based on a urethane-linked prepolymer which is then cured with amines or water to form urea linkages. The PUU adhesive may be preferably moisture cured, rather than being amine-cured. The PUU adhesive may be preferably based on a prepolymer of para-phenylene diisocyanate ("PPDI") and a polycaprolactone ("PCL"). The PUU-treated cord is particularly advantageous in polyurethane ("PU") and/or PUU belting or other polyurethane articles, whether cast elastomer or thermoplastic elastomer. With a suitable overcoat adhesive, the PUU-treated cord is also suitable for use in rubber belting, hose, or other vulcanized rubber articles. The fiber of the treated cord may preferably be carbon fiber.

The PUU adhesive may be based on a polyurethane prepolymer, such as a polyester or polyether or polycarbonate terminated with isocyanate. Such prepolymers are made by reacting a polyisocyanate, with a polyol (i.e., an hydroxy-terminated polymer, a diol and/or triol preferably). Preferably the polyisocyanate is a symmetric, compact diisocyanate, such as PPDI, 2,4- and/or 2,6-toluene diisocyanate ("TDI"), 4,4'-methylene diphenyl diisocyanate ("MDI"), etc. The polyisocyanate may not be perfectly symmetric, but preferably is symmetric. The PU prepolymer may then be dissolved in a suitable solvent along with small or compact, symmetric, diamine curative/chain extender or with water alone which may simply be available from ambient moisture present in the solvent and/or the air, which after drying the solvent, react to form urea linkages between isocyanate end groups on the prepolymer molecules. The prepolymer may be linear (i.e. with two isocyanate end groups) or branched (i.e. with three or more isocyanate end groups), but is preferably with just two or three isocyanate end groups or mixtures or blends thereof. The urea linkages/segments aggregate to form hard-segment domains interspersed throughout a soft segment matrix of polyester, polyether, etc. For a belt cord application, it has been found advantageous to make the adhesive softer than the belt body material, so small, compact curatives are preferred. The most preferable curative is water, giving the smallest hard segment and therefore the softest PUU adhesive. The most preferable soft segment for belt applications is a polyester such as polycaprolactone because of its excellent heat resistance, tear resistance, etc. Polyethers generally have a lower tear resistance than polyesters. Resistance to tear can be very important in reinforced rubber articles such as belts, especially at the interface between the cord and the body of the article or the tooth compound of the belt. The most preferable diisocyanate for belt applications is PPDI because of its thermally stable linkages, and because it has the best reactivity with water, the preferred curative. Cords made with the preferred PUU are extremely flexible after being dipped or treated, and thus partially or fully impregnated with PUU. As a result, the treated cords exhibit minimal handling damage during processing and end use, and they bond well to various cast PU or PUU belt body formulations, to thermoplastic elastomers ("TPE"s), and thermoplastic polyurethanes ("TPU"s), and to rubber in vulcanized rubber belts. For some applications, bonding may be enhanced with suitable overcoat adhesives.

The general term "polyurethane" (PU) may be commonly used in the art to include polyureas, polyisocyanurates, and other polymers which may have little or no actual urethane groups or linkages. Herein, "polyurethane" is used in a more literal sense to refer to polymers which are reaction products of isocyanates and alcohols and thus contain significant amounts of urethane linkages, —NR—CO—O—. Herein and in the claims, "polyurea" is used to refer to polymers which are reaction products of isocyanates with themselves in the presence of moisture or water, or reactions of isocyanates with amines which may be reaction intermediates, resulting in significant amounts of urea linkages, —NR'—CO—NR"—. In these urethane or urea linkages, R, R', and R" are each independently hydrogen; alkyl, or aryl groups. Included in the term "polyurea" are biurets, which are formed when a urea group reacts with additional isocyanate to form a branched polymer. "Polyisocyanurate" is used to refer to polymers which are reaction products of isocyanates with themselves at elevated temperatures to form a tri-isocyanurate ring structure. The terms, polyurea and polyurethane, are not meant to imply total purity of reaction, but are used to indicate what is believed to be the dominant reaction mechanism and/or reaction product involved in the inventive adhesive system. Thus, minor amounts of other reaction products or other reaction mechanisms may be involved without further mention in what may still be referred to herein as a predominantly polyurea-urethane reaction product. The term "polymer" will be understood to include polymers, copolymers (e.g., polymers formed using two or more different monomers), oligomers and combinations thereof, as well as polymers, oligomers, or copolymers that can be formed in a miscible blend. The term "prepolymer" refers to a monomer or system of monomers that have been reacted to an intermediate molecular weight state. This material is capable of further polymerization by reactive groups to a fully cured high molecular weight state. As such, mixtures of reactive polymers with unreacted monomers may also be referred to as pre-polymers. Typically such prepolymers are polymers of relatively low molecular weight, usually between that of the monomer and the film polymer or resin. As such, one of skill in the art will appreciate that monomers react to form the polyurea-urethane such that the monomer is no longer present once the polymer is formed. However, in some compositions described herein, both monomer and polymer may be present in the formulation prior to curing, and after curing, residual monomer may remain in the cured polymer. The term "polyamine" is meant to refer to compounds having at least two (primary and/or secondary) amine functional groups per molecule. The term "polyol" is meant to refer to compounds having at least two hydroxyl functional groups per molecule. The term "diol" is meant to refer to compounds having two hydroxyl functional groups per molecule. The term "triol" is meant to refer to compounds having three hydroxyl functional groups per molecule. The term "polyisocyanate" and "polyisothiocyanate," collectively referred to as "polyiso(thio)cyanate" are meant to refer to compounds having at least two isocyanate or isothiocyanate, respectively, functional groups per molecule. The term "diisocyanate" is meant to refer to compounds having two isocyanate functional groups per molecule.

The polyurethane prepolymers useful in embodiments of the invention may be made by reacting a polyol with a polyisocyanate according to methods known in the art. Useful polyols include but are not limited to polyester polyols, polyether polyols, polythioether polyols, polycarbonate polyols, and polycaprolactone polyols. Polycaprolactones may be considered types of polyesters. Preferred polyols for applications requiring thermal stability are non-oxidative up to 150° C., and include but are not limited to polyester polyols, polycaprolactone polyols, and polycarbonate polyols. The polyester polyols used in the present invention include but are not limited to reaction products of polyhydric alcohols, preferably dihydric alcohols with the addition of some trihydric alcohol, and/or polybasic carboxylic acids, preferably dibasic carboxylic acids with the addition of some tribasic carboxylic acids. The corresponding polycarboxylic acid anhydrides or corresponding polycarboxylic acid esters of lower alcohols or mixtures thereof are preferred over their free polycarboxylic acid counterparts for preparing the polyesters. The polycarboxylic acids may be aliphatic, cycloaliphatic, and/or aromatic in nature. The following are mentioned as non-limiting examples: succinic acid, adipic acid, suberic acid, azelaic acid, sebasic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, endomethylene tetrahydrophthalic acid anhydride, glutaric acid anhydride, fumaric acid, dimeric and trimeric fatty acids, optionally mixed with monomeric fatty acids, dimethylterephthalate and terephthalic acid-bis-glycol esters. Suitable polyhydric alcohols used to produce such polyesters include but are not limited to the following; ethylene glycol, 1,2- and 1,3-propylene glycol, 1,4- and 2,3-butylene glycol, 1,6-hexanediol, 1,8-octanediol, 1,10-decanediol, neopentyl glycol, 1,4-cyclohexane dimethanol or 1,4-bis-hydroxymethylcyclohexane, 2-methyl-1,3-propanediol, glycerol, trimethylopropane ("TMP"), 1,2,6-hexanetriol, 1,2,4-butanetriol, trimethylolethane, and mixtures thereof. Polyesters of lactones, such as ε-caprolactone, and hydroxycarboxylic acids, such as omega-hydroxycaproic acid, may also be used.

Suitable polycarbonate polyols are known and may be prepared, for example, by the reaction of diols, such as 1,3-propanediol, 1,4-butanediol, 1,6-hexanediol, 1,10-decanediol, neopentyl glycol, diethylene glycol, triethylene glycol or tetraethylene glycol, and mixtures thereof, with diaryl carbonates, e.g. diphenyl carbonate, dialkyl carbonate, e.g. diethyl carbonate, or phosgene. Suitable polyether polyols are known and include hydroxyl-terminated polyethers such as those based on alkylene oxides which includes propylene oxide (PPO), ethylene oxide, and polytetramethylene oxide (PTMO). The preferred alkylene oxide is a polypropylene oxide. The polyol may be a polyether polyol having an average hydroxyl functionality of from about 2 to 8 with an average hydroxyl equivalent weight of from about 500-5000, or a polyether polyol hydroxyl functionality of from about 2 to 4 with an hydroxyl equivalent weight of approximately 1000-3000. In an embodiment, the polyether polyol includes an average hydroxyl functionality of from about 2-3 with an average hydroxyl equivalent weight of approximately 1500-2500.

Preferred polyols are polycarbonate polyols and polyester polyols with molecular weights from about 500 to about 4000 or 5000, or mixtures of these polyols. The more preferred polyols are poly(hexamethylene carbonate) ("PCB") diol and/or triol, polycaprolactone ("PCL") diol and/or triol, and poly(hexamethylene adipate) diol and/or triol with molecular weights from about 300 or 500 to about 4000 or 5000. The most preferred polyols for tensile cords for belts and hose are polycaprolactone diols and/or triols. The most preferred molecular weights for diols range from about 1500 to about 2500 and for triols range from about 1000 to about 4000, or from about 2500 to about 3500. The polyols are dried to a moisture level of less than about 0.03% by weight, and more preferably, to a level of about 0.0150% by weight prior to reaction with the diisocyanates to form the polyisocyanate prepolymers useful for this invention. The polyol used to prepare the prepolymer may be a mixture of at least one triol selected from the above polyols and one or more other polyols, preferably diols. The most preferred diols and triols are the most preferred polyols listed above. The amount of triol crosslinker in the polyol mixture is not particularly limited since it is possible to use anywhere from about 2% up to 100% triol. Nevertheless in preferred embodiments, the amount of triol in the polyol mixture may preferably be from 5% up to about 65% by weight of the total polyol component of the prepolymer, more preferably from about 15% to about 55%. The remainder of the polyol mixture may be diol. Too little triol leads to insufficient crosslinking and little or no improvement in high temperature performance, while too much triol leads to processing or mixing difficulties from the increase in viscosity of the prepolymer and/or lack of wetting or penetration of textile reinforcement by the polyurethane and/or chemical instability of the mixture. In embodiments of the invention, the prepolymer may be prepared by mixing a diol-based prepolymer with a triol-based prepolymer. However, the increased viscosity of triol-based prepolymers makes this difficult. Thus, a preferred embodiment is a prepolymer prepared from a mixture of diol and triol, preferably PCL polyols.

Useful polyisocyanates for preparing the prepolymers include but are not limited to para-phenylene diisocyanate ("PPDI"), 2,4- and/or 2,6-toluene diisocyanate ("TDI"), 4,4'-methylene diphenyl diisocyanate ("MDI"), hexamethylene diisocyanate ("HDI"), 1,5-naphthalene diisocyanate ("NDI"), trans-1,4-cyclohexane diisocyanate ("t-CHDI"), trimethyl xylylene diisocyanate ("TMXDI"), isophorone diisocyanate ("IPDI") and the like, and mixtures thereof. The organic polyisocyanates suitable for the polyisocyanate prepolymers used in the present invention are preferably those possessing the following characteristics: compact and symmetric structure for aromatic compounds, or trans or trans,trans geometric structure for aliphatic compounds, for improved phase separation of the resulting elastomers, and high reactivity with amine groups or water to eliminate the need for catalysts in the formulations, which otherwise accelerate reversion of the resulting elastomers at high temperatures. Polyisocyanates preferred as starting components for the preparation of the polyurethane prepolymers include but are not limited to compact, symmetric aromatic diisocyanates, including but not limited to PPDI, NDI, and 2,6-toluene diisocyanate ("2,6-TDI"). The polyisocyanates useful as starting components for the preparation of the polyisocyanate prepolymers also include cycloaliphatic diisocyanates with trans or trans,trans geometric configuration. These isomers are generally pure, i.e., they exist in the substantial absence of cis-configured isomers, and thus promote good phase separation once cured. These include but are not limited to t-CHDI, and trans,trans-4,4'-dicyclohexylmethyl diisocyanate ("t,t-HMDI"). Most preferred for use in embodiments of the present invention in reinforcing tensile cords for belts and hose is PPDI.

The chain extenders (i.e. curatives) useful in the present invention are selected so as to be capable of adequate reaction time with the prepolymer, and to give the desired urea linkages, with a desired amount of phase separation and hard segment properties. The chain extender may include a compound of aliphatic amines, aromatic amines and mixtures thereof. The chain extender may include an aliphatic amine such as ethylene diamine, 1,3-diaminopropane, 1,4-diaminobutane, hexamethylenediamine, aminoethanolamine, 1,4-diaminocyclohexane, isophorone diamine ("IPDA") and triethylenetetramine. The chain extender may preferably be an aromatic amine which may include 2,4-diaminotoluene, 2,6-diaminotoluene, 1,5-napthalenediamine, 1,4-phenylenediamine, 1,4-diaminobenzene, 4,4'-methylene bis(orthochloroaniline) ("MOCA"), 1,4-butylene glycol, 4,4'-methylenebisdianiline ("MDA"), 3,5-diethyl-2,4-diaminotoluene, diethyl toluene diamine ("DETDA"), trimethyleneglycol diaminobenzoate ("TMGDAB"), 4,4'-methylenebis(3-chloro-2,6-diethylaniline) ("MCDEA"), and 3,3',5,5'tetraisopropyl-4,4'-methylenebisaniline. Preferred chain extenders are small, compact and symmetric aromatic diamines. Preferably the chain extender is no larger than TMGDAB. Preferably the curative has no more than two phenyl rings and/or no longer than a three-carbon aliphatic group. In a more preferred embodiment, the chain extender is water, including for example ambient moisture. Water forms the most compact of the urea linkages, —NH—CO—NH—. The simple urea linkages formed by the reaction with water as the curative minimize the size of the hard segment domains, while still giving good phase separation and physical properties. This leads to good flexibility of the resulting treated fibers or tensile cords, as desired for use in dynamic rubber applications like belts and hose. Moreover such a small hard segment based on water, in combination with a small symmetric diisocyanate, such as PPDI, results in a good overall balance of properties including high-temperature stability, flexibility, modulus and strength.

Symmetric primary diamine chain extenders useful in the preparation of polyurea-urethane adhesive in accordance with an embodiment of the present invention are those capable of reacting with polyisocyanate prepolymers rapidly without the need for catalysts. The symmetry of the chain extenders useful in an embodiment of the present invention provides improved phase separation and hence increase the thermal stability of the final PUU elastomers in dynamic applications. Suitable primary diamine chain extenders include but are not limited to symmetric aromatic amines with molecular weights of from about 90 to about 500, and mixtures thereof. Examples include: 1,4-phenylenediamine, 2,6-diaminotoluene, 1,5-naphthalenediamine, 4,4'-diaminodiphenyl methane, 3,3'-dimethyl-4,4'-diaminodiphenyl methane, 1-methyl-3,5-bis(methylthio)-2,6-diaminobenzene, 1-methyl-3,5-diethyl-2,6-diaminobenzene, 4,4'-methylene-bis-(3-chloro-2,6-diethylaniline), 4,4'-methylene-bis-(ortho-chloroaniline), 4,4'-methylene-bis-(2,3-dichloroaniline), trimethylene glycol di-para-aminobenzoate, 4,4'-methylene-bis-(2,6-diethylaniline), 4,4'-methylene-bis-(2,6-diisopropylaniline), 4,4'-methylene-bis-(2-methyl-6-isopropylaniline), 4,4'-diamino diphenyl sulfone, and the like. The symmetric primary diamine chain extenders may optionally be combined with a small amount of secondary diamine chain extenders in order to vary elastomer characteristics such as hardness. Suitable examples of secondary diamine chain extenders have molecular weights of from about 150 to about 500, and include but are not limited to N,N'-di-sec-butyl-amino benzene and N,N'-di-sec-butyl-amino-diphenylmethane.

It may be advantageous to block the isocyanate groups in the prepolymer. Suitable blocking reagents include polyketimines, phenols, caprolactam, oximes, triazoles, certain alcohols, and β-dicarbonyl compounds such as ethyl acetoacetate and ethyl malonate. A preferred blocking agent is methyl ethyl ketoxime ("MEKO").

The present invention may also utilize various other additives in order to assist in the processing of a product from the composition of the invention or to assist in the functioning of a product made from the elastomer of the invention, including antioxidants, plasticizers, fillers, colorants, adhesion promoters, co-reactants, chain extenders, and the like. For example, antioxidants are particularly useful when the elastomeric composition of the present invention is utilized in a power transmission belt product. Suitable antioxidants include 2,6-di-t-butylphenol and polyalkylene glycol esters of hindered phenols of substituted alkanoic acids. Examples of antioxidants include 3,5-di-t-butyl-4-hydroxybenzoic acid ester of ethylene glycol, bis{3-(3-methyl-5-t-butyl-4-hydroxyphenyl)propionate} of trimethylene glycol. Examples of useful or suitable plasticizers include organo-phosphates, dialkyl-ether di-alkylesters and polyalkylene-ether di-alkylesters, such as di- or poly-ethylene glycol di-alkylesters. Dialkyl-ether diesters include $C_4$ to $C_{12}$-esters of $C_1$- to $C_4$-ether- or polyether-dicarboxylic acids. Examples of such plasticizers may include esters such as caprate, caprylate, hexanoate, heptanoate, pelargonate, 2-ethylhexoate, and the like. Examples of such plasticizers may include di-alkylesters of ethers such as ethylene glycol, propylene glycol, triethylene glycol, tetraethylene glycol, and polyethylene glycols having a molecular weight of up to about 800. Other polyols, polyisocyanates, isocyanate-terminated polymers, epoxies, and/or amines may be included, though preferably they are not included, as adhesion promoters, co-reactants, chain extenders.

Other added compounds may be useful with the composition of the present invention. These include catalysts to decrease the reaction time of the components. The catalysts may be selected from any desirable compound known in the art such as organo-metal compounds, tertiary amines, and alkali metal alkoxides. However, the polyurea-urethanes can be prepared with or without catalysts, whereas polyurethanes based on polyols which do not contain amine terminated groups are most typically prepared with a catalyst. Suitable organo-metal compounds useful as catalysts include but are not necessarily limited to aliphatic soaps of tin, mercury, iron, zinc, bismuth, antimony, cobalt, maganese, vanadium, copper and the like. Examples include organic ligands which are carboxylic acids of 2-20 carbons, such as dibutyl tin dilaurate, dimethyl tin dilaurate, phenyl-mercuric propionate, copper naphthenate, bismuth neodecanoate, and the like. In a preferred embodiment, no catalyst is used.

Thus, a preferred embodiment of an adhesive composition according to the invention comprises as the only reactive ingredients the polyurethane prepolymer and a compact diamine curative or water alone as the curative.

Throughout the present disclosure, the term "cord treatment" is used to denote a material applied to a yarn and/or yarn filament (which may or may not include a sizing) and which ends up located at least on a portion of the yarn and/or yarn filament surface or sized surface and within at least a portion of one or more interstices formed between such filaments and yarns.

Many polyisocyanate prepolymers are commercially available and may be beneficially employed in the practice of one or more embodiments of the present invention; and include those generally referred to as "low free" prepolymers as described for example in U.S. Pat. No. 6,174,984 to Peter, U.S. Pat. No. 5,703,193 to Rosenberg, U.S. Pat. Pub. No. 2003/0065124 to Rosenberg et al., and U.S. Pat. No. 6,046,297 to Rosenberg et al., in which the level of free diisocyanate in the prepolymer is reduced to a level of, e.g., less than 1% of the prepolymer, or less than 0.5%, or less than 0.25%, e.g., about 0.1% or lower.

Suitable isocyanate-terminated prepolymers for carrying out the invention include the following available on the market. For example, a number of useful prepolymers are available under one or more of the ADIPRENE®, DURACAST, and VIBRATHANE® trademarks from Chemtura Corporation, including Adiprene® LFP 2950A, a preferred low-free-monomer, PPDI-terminated polycaprolactone prepolymer; Adiprene® LFP 3940A, a PPDI-terminated polycarbonate prepolymer; Adiprene® LFP 1950A, a PPDI-terminated polyester prepolymer; Adiprene® LF 1950A, a TDI-terminated polyester prepolymer, and Adiprene® LFP 950A, a PPDI-terminated polyether prepolymer; Adiprene® LF 1600D, LF 1700A, LF 1800A, LF 1860A, and LF 1900A, are useful low-free-monomer, TDI-terminated polyester prepolymers; and Adiprene® LF 600D, LF 750D, LF 753D, LF 800A, LF 900A, LF 950A, LFG 740D, LFG 920, and LFG 964A are useful low-free-monomer, TDI-terminated polyether prepolymers; Adiprene® LFM 2450, Duracast™ C930, and Vibrathane® 8030 and 8045 are useful MDI-terminated polycaprolactone prepolymers; Adiprene® LFH 120, 2840, and 3860 are useful HDI-terminated prepolymers. Useful prepolymers are also available under one or more of the trademarks VULKOLLAN® and BAYTEC® from Bayer Material Science; under the TECHTHANE® trademark from Trelleborg; under the AIRTHANE® and/or VERSATHANE® trademarks from Air Products and Chemicals, Inc.; polyurethane prepolymers sold under the ECHELON™ trademark from Dow; and so on.

Figure 1:
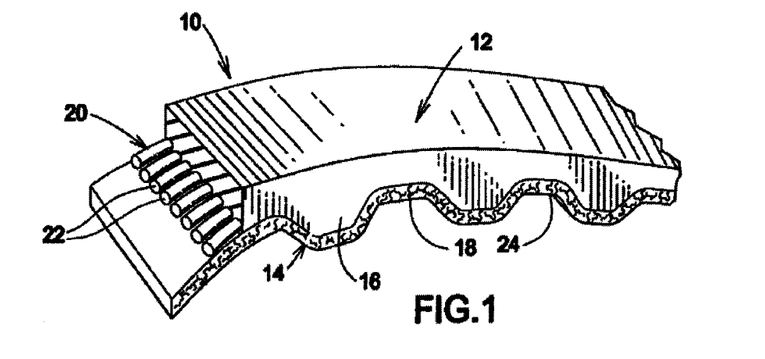
FIG. 1 is a fragmented perspective view, with parts in section, of a timing belt constructed in accordance with an embodiment of the present invention.

Referring to FIG. 1, a typical timing belt 10 is illustrated. Belt 10 includes elastomeric main body portion 12 and sheave contact portion 14 positioned along the inner periphery of main body portion 12. This particular sheave contact portion 14 is in the form of alternating transverse teeth 16 and land portions 18 which are designed to mesh with a transverse-grooved pulley or sprocket. Tensile layer 20 is positioned within main body portion 12 for providing support and strength to belt 10. In the illustrated form, tensile layer 20 is in the form of a plurality of tensile cords 22 aligned longitudinally along the length of main body portion 12. It should be understood that, in general, any type of tensile layer 20 known to the art may be utilized. Moreover, any desired material may be used as the tensile member, such as cotton, rayon, polyamide, polyester, aramid, steel, glass, carbon, PBO, polyketone, basalt, boron, and even discontinuous fibers oriented for low load carrying capability. In the embodiment of FIG. 1, tensile layer 20 is in the form of illustrated tensile cords 22 made from one or more yarns of high-modulus fiber, twisted or plied together into a cord and treated with the PUU adhesive treatment described herein. Preferred high-modulus fibers include carbon, polyethylene naphthalate (PEN), poly(p-phenylene-2,6-benzobisoxazole) (PBO), aramid, basalt, boron, or liquid crystal polymer (LCP). In a preferred embodiment, the cords 22 comprise aramid or carbon fiber. More preferably, the cord may be a twisted filament yarn, or a twisted bundle of yarns of continuous carbon filaments.

By aramid is meant a long chain synthetic polyamide having its amide linkages attached directly to two aromatic rings in either the para or meta position. In the present invention, use may be made, for example, of PPD-T, polypbenzamide), copoly(p-phenylene/3,4'-oxydiphenylene terephthalamide), or the like. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. Commercial aramid fibers suitable for the practice of this invention include those sold under the trademarks TEIJINCONEX, TECHNORA, and TWARON by Teijin Limited, and under the trademarks NOMEX, and KEVLAR by E.I. DuPont de Nemours and Company.

Reinforcing fabric 24 may be utilized and intimately fits along the alternating teeth 16 and alternating land portions 18 of belt 10 to form a face cover or tooth cover for the sheave contact portion. This fabric may be of any desired configuration such as a conventional weave consisting of warp and weft threads at any desired angle or may consist of warp threads held together by space pick cords, or of a knitted or braided configuration, or a nonwoven fabric, and the like. More than one ply of fabric may be employed, or combinations of different fabric types. If desired, fabric 24 may be cut on a bias so that the strands form an angle with the direction of travel of the belt. Conventional fabrics may be employed using such materials as cotton, polyester, polyamide, acrylic, aramid, polyketone, hemp, jute, fiberglass, and various other natural and synthetic fibers including blends or combinations thereof. In a preferred embodiment of the invention, fabric layer 24 consists of an expansible wear-resistant fabric in which at least one of the warp or weft threads is made of nylon. In the preferred form, fabric layer 24 is made from a nylon 66 stretch fabric, and presents an elastomer-free (polyurethane/urea-free) surface for engaging cooperating drive sheaves. The elastomer-free surface may include a polymeric film laminated to the fabric. The fabric may also be treated with the inventive PUU cord adhesive if desired.

Figure 2:
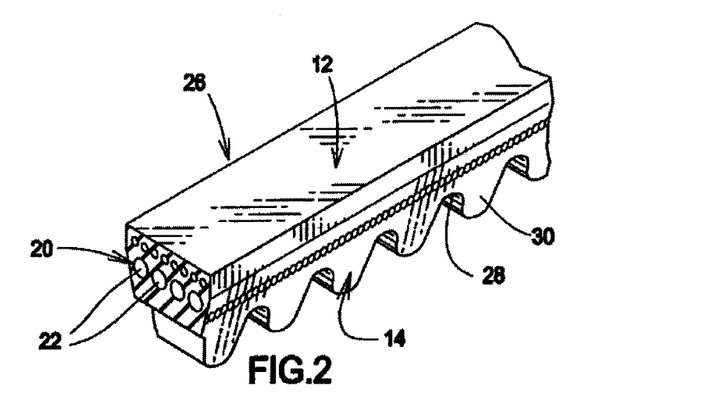
FIG. 2 is a fragmented perspective view, with parts in section, of a V-belt constructed in accordance with an embodiment of the present invention.

Referring to FIG. 2, standard notched V-belt 26 is illustrated therein. V-belt 26 includes an elastomeric body portion 12 similar to that of FIG. 1 and tensile reinforcement layer 20 in the form of cords 22, also similar to that as illustrated in FIG. 1. The elastomeric body 12, tensile layer 20, and cords 22 of V-belt 26 may be constructed from the same materials as described above for FIG. 1. It should be noted that the tensile layer 20 may optionally include an elastomeric composition or rubber material that is different than the rest of the main body portion in order to provide a transitional layer in terms of modulus or other property and/or to function as an adhesive layer between cord and main body. The optional adhesive rubber member may for example be of higher modulus than the main body as described in U.S. Pat. No. 6,616,558 to South, the contents of which are hereby incorporated herein by reference.

V-belt 26 also includes sheave contact portion 14 as in the power transmission belt of FIG. 1. In this embodiment, however, sheave contact portions 14 are the two juxtaposed sides of the belt, designed to wedge into a V-sheave. The bottom surface of V-belt 26 is in the form of alternating notch depression surfaces or troughs 28 and projections 30. These alternating notched depression surfaces 28 and projections 30 may follow a generally sinusoidal path as illustrated which serves to distribute and minimize bending stresses as the sheave contact portion 14 passes around pulleys and sheaves. Various notch profiles that deviate from sinusoidal in various ways are also useful. However, troughs 28 and projections 30 are optional. Included in the category of V-belts are those V-belts designed for continuously variable transmission ("CVT") applications, which often exhibit a belt body relatively wider than the belt thickness.

Figure 3:
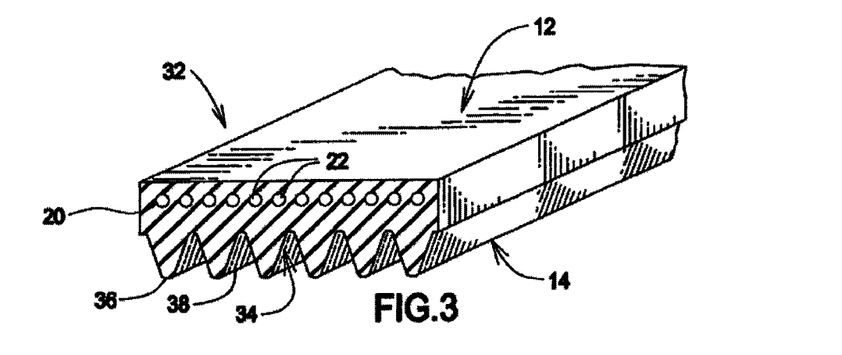
FIG. 3 is a fragmented perspective view, with parts in section, of a multi-V-ribbed belt constructed in accordance with an embodiment of the present invention.

Referring to FIG. 3, multi-V-ribbed belt 32 is illustrated. Multi-V-ribbed belt 32 includes main elastomeric body portion 12 as in the belts of FIGS. 1 and 2 and also includes tensile reinforcement member 20 preferably in the form of cords 22, also as previously described. Longitudinally grooved sheave contact portion 14 is in the form of a plurality of raised areas or apexes 36 alternating with a plurality of trough areas 38 having oppositely facing sides which define driving surfaces 34 of the belt 32. In each of these instances of FIGS. 1-3, sheave contact portion 14 is integral with main body portion 12 and may be formed from the same elastomeric material to be described in greater detail below, or layered of different material. While the present invention is illustrated with reference to the embodiments shown in FIGS. 1-3, it should be understood that the present invention is not to be limited to these particular embodiments or forms as illustrated but rather is applicable to any belt construction within the scope of the claims as defined below.

Carbon fiber is typically made by carbonizing another fiber such as polyacrylonitrile fiber, wherein during the carbonizing process the diameter of the fiber is substantially reduced. Carbon yarn is generally characterized by the number of fibers contained therein rather than by denier or dtex. A nomenclature of numbers and the letter "k" are used to denote the number of carbon fibers in a yarn. Of course, carbon fiber may be characterized by such other terms where desired. In a "3 k" carbon fiber yarn, the "k" is an abbreviated designation for "1000 fibers," and the "3" designates a multiplier. Thus "3 k" carbon yarn identifies a yarn of 3000 fibers or filaments. The filaments are generally of sufficient length to be considered continuous. Like other textile materials, a number of carbon fibers are combined to form a yarn. A yarn may be combined with other yarn to form a larger yarn, and the yarn or yarn bundles may be twisted together to form a cord. Carbon fiber may have an extremely small diameter which may be in the range of from about 4 to about 8 microns, or about 5 to 7 microns. Individual fibers are easily fractured when a yarn is processed to form a cord. For this reason, it is desirable to minimize the number of mechanical operations that the yarn is subject to when forming a cord. For example, twisting several yarns together to form a yarn bundle and reverse twisting the so plied yarn bundles to form a cord are mechanical operations that fracture individual fibers. The number of fractures are lessened by reducing the number of twisting operations. To form a desired cord size may include bundling together multiple yarns of smaller filament count, for example, five 3 k yarns to obtain 15 k (designated 3 k-5), or three 6 k yarns to obtain 18 k cord (designated 6 k-3). Preferably the twist level is not too high so as not to damage fibers. Thus a preferred twist level is from 0.75 to 2.5 turns per inch, or up to about 2 turns per inch. The final carbon fiber bundle may be from 3 k to 60 k, depending on the desired application.

Fiber manufacturers often coat fibers with a sizing which acts to lubricate the fiber and inhibit fracturing as the fiber is processed into yarns and wound on spools. In some instances, the sizing may have a chemical structure that is compatible with an adhesive used to treat a cord for inclusion into a power transmission belt. Types of sizing used by carbon fiber manufacturers include for example epoxies, blends of epoxy with polyurethane, organosiloxanes, polyamide-imides, and others. Sizing may be present at a pickup weight of about 0.1 to about 2.5% based on the yarn final weight. It is believed that embodiments of the invention described herein are not particularly sensitive to the type or level of sizing which may be present on the carbon fiber. It may be that the primary mode of bonding of the PUU adhesive treatment to the carbon fiber bundle is physical interlocking rather than chemical bonding. Also, the present invention may involve using a solvent to apply the PUU adhesive to the carbon fiber bundle, and the solvent may penetrate or even remove the sizing if desired.

The elastomeric belt (or other article's) body portion may be vulcanized rubber or other crosslinked elastomer such as cast polyurethane (PU); or may be thermoplastic elastomer (TPE) or thermoplastic polyurethane (TPU). The PUU cord treatment disclosed herein is particularly compatible with a cast polyurethane or PUU belt body, and can advantageously be used therewith without need for any additional adhesive treatment. Likewise, the PUU cord treatment may be compatible with TPE and TPU elastomers and may not require any additional adhesive treatment for use therewith. In the case of vulcanized rubber articles, it may be advantageous to include one or more additional adhesive treatments to provide improved bonding between the PUU-treated tensile cord and the vulcanized elastomer. Such an additional adhesive treatment will be referred to herein as an overcoat or an overcoat adhesive. It may be advantageous to use two different overcoat adhesives to provide maximum bonding between the PUU and a rubber belt body material.

Regarding the main elastomeric body for use with an embodiment of the PUU-treated tensile cord, useful cast PU or PUU compositions that may be utilized in the practice of various embodiments of the present invention, and such compositions and methods are described for example in U.S. Pat. No. 5,231,159 to Patterson et al. and U.S. Pat. No. 6,964,626 to Wu et al., the contents of which are incorporated herein by reference. PUU typically has better dynamic properties relative to PU due to enhanced phase separation, tougher hard segments, etc., and PUU is therefore preferred for high-performance belt applications.

The elastomeric body may be formed of TPE or TPU using for example thermoplastic lamination processes for long length belting, or suitable other molding processes. TPE types that may be useful in various embodiments include without limit polystyrene-elastomer block copolymers, polyester block copolymers, polyurethane block copolymers, polyamide block copolymers and polypropylene/EP copolymer blends. TPU types that may be useful in various embodiments are not particularly limited, but may include similar chemistry as discussed above in connection with cast polyurethanes, such as polyester thermoplastic urethanes or polyether thermoplastic urethanes. Thermoplastic belting embodiments may have the general form of the toothed belt of FIG. 1, e.g. an endless belt, either as molded or by joining two belt ends together. Embodiments may have two ends which may be clamped to various associated mechanisms, for example, in conveying, transporting, holding, or positioning applications.

In each of the cases of FIGS. 1-3 shown above, the main belt body portion 12 may be formed of any conventional and/or suitable cured elastomer composition, and may be of the same as or different from that described below in relation to the optional adhesive rubber member comprising tensile layer 20. Suitable elastomers that may be utilized for this purpose include for example polyurethane elastomers (including as well polyurethane/urea elastomers and so-called millable gums) (PU), polychloroprene rubber (CR), acrylonitrile butadiene rubber (NBR), hydrogenated NBR (HNBR), styrene-butadiene rubber (SBR), alkylated chlorosulfonated polyethylene (ACSM), polyepichlorohydrin, polybutadiene rubber (BR), natural rubber (NR), and ethylene alpha olefin elastomers such as ethylene propylene copolymers (EPM), ethylene propylene diene terpolymers (EPDM), ethylene octene copolymers (EOM), ethylene butene copolymers (EBM), ethylene octene terpolymers (EODM); and ethylene butene terpolymers (EBDM); ethylene vinylacetate elastomers (EVM); ethylene methylacrylate (EAM); and silicone rubber, or a combination of any two or more of the foregoing.

To form the elastomeric belt (or other article's) body portion 12 in accordance with an embodiment of the present invention, the elastomer(s) may be blended with conventional rubber compounding ingredients including fillers, plasticizers, stabilizers, vulcanization agents/curatives and accelerators, in amounts conventionally employed. For example, for use with ethylene-alpha-olefin elastomer and diene elastomers such as HNBR, one or more metal salts of alpha-beta organic acids may be employed in amounts now conventionally utilized to improve dynamic performance of the resultant article. Thus zinc dimethacrylate and/or zinc diacrylate may be utilized in such compositions in amounts of from about 1 to about 50 phr; or alternatively of from about 5 to about 30 phr; or of from about 10 to about 25 phr. These materials furthermore contribute to the adhesiveness of the composition, and increase the overall cross-link density of the polymer upon curing with peroxide or related agents through ionic crosslinking, as is now well known in the art.

One skilled in the relevant art would readily appreciate any number of suitable compositions for utilization in or as the elastomeric portions of the rubber articles useful herein. A number of suitable elastomer compositions are described for example in The R. T. Vanderbilt Rubber Handbook (13$^{th}$ ed., 1996), and with respect to EPM or EPDM compositions and such compositions having particular high tensile modulus properties, are furthermore set forth in U.S. Pat. Nos. 5,610,217, and 6,616,558 respectively, the contents of which, with respect to various elastomer compositions that may be suitable for use in the formation of power transmission belt body portions, are specifically incorporated herein by reference. In an embodiment of the present invention associated with automotive accessory drive applications, the elastomeric belt body portions 12 may be formed of a suitable ethylene alpha olefin composition, such as an EPM, EPDM, EBM or EOM composition.

The elastomeric main belt body portion 12 may moreover be loaded with discontinuous fibers as is well known in the art, utilizing materials such as including but not limited to cotton, polyester, fiberglass, aramid and nylon, in such forms as staple- or chopped fibers, flock or pulp, in amounts generally employed. In a preferred embodiment relating to profiled (e.g., as by cutting or grinding) multi-v-ribbed belts, such fiber loading is preferably formed and arranged such that a substantial portion of the fibers are formed and arranged to lay in a direction generally transverse the direction of travel of the belt. In molded multi-v-ribbed belts and/or synchronous belts made according to flow through methods however, the fiber loading would generally lack the same degree of orientation.

For use in rubber belts, the PUU-treated cords of the present invention may advantageously be coated with a secondary adhesive intended to primarily coat the outer surface of the cord bundle. Such an adhesive is called an overcoat adhesive herein. Overcoat is generally applied at a level in the range of from about 1% to about 10% dry weight, based on the final weight of the so treated cord. Examples of useful overcoat adhesives are found in the art and include without limitation various compositions sold under the trademarks CHEMLOK or CHEMOSIL by Lord Corporation, and various compositions sold under the trademark CILBOND by Chemical Innovations Limited (CIL). The particular overcoat may be chosen to be compatible with both the underlying adhesive treatment and the rubber belt body and to have other desired properties such as heat resistance, environmental resistance, or the like. It may be advantageous to apply two separate overcoat adhesive compositions. If the PUU-treated cord is only partially impregnated, a first overcoat may be used to fully impregnate the cord and a second overcoat to coat the outer surface of the treated cord bundle. For some combinations of PUU treated cord and a rubber belt body composition, it may be advantageous to use a two-layer overcoat to ensure good bonding, for example, since PUU may be more polar than many elastomers.

Thus, the invention provides a method for preparing a high-modulus tensile cord, such as carbon cord, at least partially filled or impregnated with a PUU binder. Compared to prior art use of greige carbon cord (or other high-modulus cords) in cast PU belts, the invention provides independent control of the cord properties. For example, the PUU binder used in a carbon cord may be selected to be softer than the cast PU of the belt body. The invention thus may improve belt handling properties without negatively impacting dynamic load or flex capacity. The invention may also improve the processing and the product produced in low pressure casting operations and in processes in which the casting resin has a faster gel time or higher viscosity, because the cord is already impregnated with a PUU binder, which give the cord integrity and prevents fraying upon cutting, whether or not the subsequent casting resin penetrates the cord also. The ability to treat the already-twisted carbon fiber with a low viscosity adhesive advantageously may produce a generally rounder, more uniform cord than prior treating methods which required spreading the fibers during treating, followed by twisting.

In one embodiment of a cast PU article or belt having a high modulus tooth or body PU compound, the tensile cord may be treated with a solution of polyurethane prepolymer and cured with a smaller curative molecule than the cast PU, yielding a lower modulus binder of similar, or at least compatible chemistry. Thus, the complex modulus of the cord may be reduced (i.e. the flexibility of the cord may be increased) without negatively affecting composite integrity. There is good adhesion between the filled cord and the body/tooth compound. Preferably the body PU compound is replaced within the cord with a similar prepolymer but with a smaller, more compact hard segment or curative such as water, in order to give a softer, lower modulus cord treatment. Thus, the cord adhesive curative may preferably be water, while the body of the article may utilize the same prepolymer but a more conventional chain extender such as diamine or polymeric diamine or the like.

To apply the PUU adhesive resin to the tensile cord fibers, the adhesive composition ingredients may be dissolved or suspended in a suitable solvent. A suitable solvent is one that will dissolve the prepolymer and also wet out the fibers of the tensile cord for good impregnation. A low contact angle between the solvent or adhesive solution and the fiber is desirable. Suitable solvents include without limitation, tetrahydrofuran ("THF"), dimethyl sulfoxide, dimethyl formamide, N-methylpyrrolidone ("NMP"), toluene, xylene, benzene, acetone, methyl ethyl ketone, methyl isobutyl ketone, and the like. For treating carbon fiber cords according to an embodiment of the invention, preferable solvents include THF and toluene.

In a preferred embodiment, a low free PPDI/polycaprolactone prepolymer is dissolved in a solvent, such as toluene or THF, at a predetermined concentration which may be in the range 10-50% by weight, or from 20% to 40% by weight, and the solution is added to a dip tank. The cord, which may preferably be in twisted form, e.g. from 0.75 to 2.5 turns per inch for carbon fiber cord, is pulled though the dip tank and then through an oven, where, the solvent is flashed off. Alternately, the cord may be dipped and dried in untwisted form, with means to spread the fibers for maximum penetration, followed by twisting. After passing through the oven, and removing most of the solvent, the prepolymer is allowed to react with water. The cord can be dipped in a water bath to enhance the reaction before spooling, for example to prevent sticking of the cord on the spool. The water bath can, but need not, contain a chemical, such as a catalyst, that accelerates the formation of a urea skin on the outside of the cord. Likewise heat, for example in a drying oven, can be used to accelerate urea skin formation. The prepolymer on the inside of the cord will cure with ambient environmental moisture. This cure on the inside of the cord may take several days, but the cord may be used in a product made with cast PU at any time after treating, whether fully cured or not. The cord will continue to cure as the product is cured. Even a fully cured cord treatment will generally have sufficient reactive groups to continue to cure and bond with the body material of a product during product cure. Water performs the function of curative by reacting with isocyanate groups on the prepolymer. Isocyanate reacts with water to form carbamic acid. Carbamic acid dissociates to form an amine and carbon dioxide. The amine will react with isocyanate to form a di-substituted urea linkage and further the condensation reaction. This reaction creates a very compact hard segment with urea linkages.

According to an embodiment of the invention, the PUU treatment may advantageously be 20-40% solids and preferably of low enough viscosity to fully penetrate the fiber bundle during a dip treatment whether twisted or not. After the solvent is removed by drying, the PUU preferably coats the individual fibers of the bundle, but need not completely fill the interstices of the cord. It may be advantageous for the PUU resin to occupy from about 20% to about 99% or 100% of the interstices, depending on the intended use of the treated cord. In particular, for use in cast polyurethane articles such as power transmission belts, only partially filling the interstices, e.g., from 20% to 90%, or 30% to 80% full, or 40% to 60% full, may leave interstices or voids that can be penetrated by the cast PU of the belt body, thus providing a level of mechanical adhesion without making the cord overly stiff and still benefitting from the use of the PUU treatment. When a cast PU belt body thus penetrates voids in the PUU-treated cord, the PU and PUU materials may be in intimate contact, facilitating chemical bonding between them. On the other hand, when the cord is to be overcoated with additional adhesives for chemical adhesion as might be done for bonding in certain rubber articles, more fully impregnated cord may be more suitable, e.g., from 40% to 100%, or 60% to 99% full. The pickup levels, indicated for example as weight % adhesive pickup based on weight of the treated cord, may vary depending on the degree of voids or interstices in the twisted cord. The pick up level of the PUU adhesive on the cord may be in the range from 6% to 25%, or 8% to 22% or from 10% to 15%.

Cast urethane belts according to an embodiment utilizing the inventive tensile cords may be made according to known methods such as those described in references already incorporated herein by reference. Likewise, TPE or TPU belts may be made by known methods, including continuous lamination methods that produce belts having two ends, instead of endless belts. The two ends may be joined according to known methods to make endless TPE or TPU belts. Rubber belts may be built on a mandrel, cured, and cut to width according to methods known in the art.

It should be understood that reinforcing cords according to an embodiment of the invention may be used in various kinds of elastomeric composite articles, such as power transmission belts, transport or transfer belts, straps, tires, hose, air springs, vibration mounts, etc.

EXAMPLES

The following illustrations and examples are not meant to limit the invention, but demonstrate its usefulness in various embodiments. Examples demonstrate use of the invention in cast polyurea-urethane belt applications, TPU belt applications, and rubber belt applications.

Illustration I.

A pair of 12 k-1 yarns identified as G30 700 12 k HTA-7C from Toho were twisted in opposite directions to a level of 2.0±0.1 turns per inch to form "S" and "Z" 12 k carbon cords. A portion of the greige, twisted cord was used to make a slab of cast PU toothed belts of 8-mm pitch according to the method of U.S. Pat. No. 5,807,194 to Knutson et al., referred to herein as Comparative Example 1 ("Comp. Ex." 1). Another portion of the cord was treated according to an embodiment of the present invention and then used to make a second slab of inventive 8-mm-pitch, toothed belts, referred to herein as Example 2 ("Ex." 2).

For the PUU adhesive treatment of Ex. 2, a blend of di- and tri-functional PPDI-terminated polycaprolactone prepolymer with a final functionality of approximately 2.1 was added to toluene solvent to make a 33 weight-percent solids solution for the dip tank. The greige twisted cord was dipped and then the solvent flashed off by passing the wet cord through an oven. Immediately after exit from the oven the cord was dipped in a water bath, air dried, and then wound onto a spool. Solids pickup was determined for "S" and "Z" dipped cords at 16.1 and 14.0 weight percent, respectively. Cord stiffness was measured immediately after spooling and after sitting in a high humidity environment overnight. Cord stiffness was measured on a Tinius Olsen Stiffness Tester according to the procedure of ASTM D747 but based on the actual peak bending force in units of pounds force (or kilograms force) for five parallel cords tested at a 12.7-mm span over a deflection range of from zero to 65°. The initial stiffness of Ex. 2 was 0.49 and 0.73 lbf, respectively. After sitting overnight the stiffness was measured at 1.14 and 1.08 lbf, respectively. Water cure may be relatively slow, resulting in a gradual change in stiffness over hours or even days. Based on the reported equivalent cross section of carbon in the yarn (0.00455 $cm^2$) and the final cord cross sectional area in the belts (0.00665 $cm^2$), the void volume in the cord was calculated to be about 31.6% of the final cross section. The weight percent of treatment picked up for the S and Z cords thus corresponds to the interstices of the cord being filled about 55 to 60 percent with PUU resin. Inspection of the resulting cords showed that the outer layer of fibers was lightly coated leaving plenty of interstitial space for additional impregnation by the cast PU during belt building, resulting in very good adhesion of the cord to the belt body.

Tensile testing of the treated cord versus the greige cord yielded a tensile strength of 148 lbs for the greige cord and 222 lbs for the treated cord, a 50% improvement. This dramatic improvement in tensile strength may reflect the difficulties in tensile testing greige yarns, and the improvement in handling properties of the treated yarn. Inspection of belt cross sections under high magnification revealed that the cast PU resin had substantially fully filled all interstices remaining after adhesive treating the cord. The cast PU resin formulation used to make the belts was based on a TDI-terminated polyether prepolymer based on polytetramethylene ether glycol ("PTMEG"), cured with TMGDAB.

After belt manufacture, samples of cord were removed from greige- and treated-cord belts and subjected to the cord stiffness test. Two parallel cord samples were used instead of the usual five. The cord from Comp. Ex. 1 was stiffer than the treated cord, from Ex. 2, namely 0.66 vs 0.52 lbf, respectively. The inventive cord treatment thus lowered the static bending stiffness of the cord in the belt by approximately 20%.

Dynamic belt bending testing at two frequencies and temperatures also showed a significant modulus difference between greige and treated cords. The results for this testing are presented in Table 1. At all test conditions, belt bending moduli were lower for the belt with treated cord of Ex. 2 than for the belt with greige cord of Comp. Ex. 1. Treatment of the cord with the inventive PUU adhesive treatment reduced the dynamic bending modulus of the cord.

TABLE 1

| 3-point dynamic bending test | Comp. Ex. 1 | Ex. 2 | Ratio of Ex. 2: Comp. Ex. 1 |
|---|---|---|---|
| $K^*$ at 23° C., 0.1 Hz (N/mm)[1] | 7.86 | 5.00 | 0.64 |
| $K'$ at 23° C., 0.1 Hz (N/mm)[2] | 7.59 | 4.88 | 0.64 |
| $K''$ at 23° C., 0.1 Hz (N/mm)[3] | 2.03 | 1.09 | 0.53 |
| $K^*$ at 100° C., 0.1 Hz (N/mm) | 5.96 | 3.65 | 0.61 |
| $K'$ at 100° C., 0.1 Hz (N/mm) | 5.87 | 3.62 | 0.62 |
| $K''$ at 100° C., 0.1 Hz (N/mm) | 1.02 | 0.49 | 0.48 |
| $K^*$ at 23° C., 1.0 Hz (N/mm) | 8.40 | 5.14 | 0.61 |
| $K'$ at 23° C., 1.0 Hz (N/mm) | 8.13 | 5.05 | 0.62 |
| $K''$ at 23° C., 1.0 Hz (N/mm) | 2.12 | 0.97 | 0.46 |
| $K^*$ at 100° C., 1.0 Hz (N/mm) | 5.91 | 3.71 | 0.63 |
| $K'$ at 100° C., 1.0 Hz (N/mm) | 5.84 | 3.68 | 0.63 |
| $K''$ at 100° C., 1.0 Hz (N/mm) | 0.93 | 0.46 | 0.49 |

[1] $K^*$ is the complex stiffness.
[2] $K'$ is the storage or elastic stiffness.
[3] $K''$ is the loss or inelastic stiffness.

The PUU treatment of Ex. 2 was also mixed into THF at a concentration of 25% solids by weight and used to cast a film on an IR window. The resulting PUU film was 0.018 inches thick. It was placed in FTIR instrument to follow the solvent evaporation and the reaction of the NCO groups with water. The NCO peak area was reduced 50% after about 200 minutes, and substantially gone after about 500 minutes. An attempt was made to cast a thicker film of the inventive treatment and the cast PUU of the belt body for tensile testing. Though some bubbles were observed, the resulting films were deemed sufficient for a tensile test comparison. The water-cured adhesive treatment exhibited a modulus about ⅔ less than that of the TMGDAB-cured belt material, an elongation about the same, and a tensile strength about ⅓ less. Thus, according to an embodiment of the invention, a reinforcing cord may be treated with a moisture-cured PUU analog of a diamine-cured PUU casting composition to obtain a relatively lower modulus, more flexible cord with equivalent to much better tensile strength, and with excellent compatibility with the cast PUU.

The belts of Ex. 2 were subjected to a number of tests, demonstrating certain advantages over Comp. Ex. 1. Belt tensile strength was measured by mounting a belt on two 60-groove sprockets, and pulling on a conventional tensile test machine at 25.4 mm/min with a clip-on extensometer optional. Flex Conditioning of the belts was carried out on a two-point layout with two 22-groove pulleys driven at 3600 rpm with 165-pound deadweight tension for 168 and 336 hours. Retained tensile strength after (i.e., "post") flex conditioning is reported in Table 2. In a back-bending test, belts were back-bent three times in the same location of the belt around a pipe of given diameter and then tensile tested with the damage location in the span between the two pulleys. The retained tensile strength after back bending is also reported in Table 2. Static cord adhesion tests (pulling a short length of two cords out of the belt) and a static tooth shear test on the belts showed no significant differences between Comp. Ex. 2 and Ex. 1. Finally, dynamic belt tests were run on a dynamometer rig ("Dyno Testing") to evaluate belt load capacity, dynamic adhesion, durability and the like. Dyno Testing used an 18-mm wide, 140-tooth, 8-mm GT® profile belt run at 19 hp and 2000 rpm, on two 24-groove pulleys with 213 pounds dead weight tension at room temperature. Two different testers known for significantly different results were used. Two belt lives were averaged for each result reported in Table 2.

It can be seen from Table 2 that the inventive belt has slightly higher tensile strength initially and after flex conditioning than the control belt. This may be attributable to the treated cord having improved handling tolerance over the greige cord. However, the back-bending test shows most clearly a dramatic advantage of the softer PUU-treated cord over the greige cord. While the greige cord loses half its strength after the 27-mm back bends, the inventive cord suffers no strength loss. At tighter back bends, the inventive cord does lose strength, but at a much lesser rate than the control belt. Thus, the inventive belt performs similarly under 10-mm bends as the control under 27-mm bends. It can also be seen from Table 2 that the Ex. 2 belts performed a little better on average than the control belts on the Dyno Testing (the tooth shear failure mode was observed for all belts). Thus, the soft PUU adhesive treatment provides significant improvement in handling tolerance without loss of other performance features such as adhesion or load capacity.

TABLE 2

|  | Comp. Ex. 1 | Ex. 2 |
|---|---|---|
| Belt Tensile Strength Tests (lbf/inch belt width) |  |  |
| Initial Tensile Strength | 9406 | 11552 |
| Post Flex Conditioning (168 hrs.) | 9500 | 10000 |
| Post Flex Conditioning (336 hrs.) | 9400 | 10000 |
| After back bends at 27-mm diameter | 4800 | 10900 |
| After back bends at 17-mm diameter | 2600 | 7000 |
| After back bends at 10-mm diameter | 2000 | 4600 |
| After back bends at 4.5-mm diameter | 1700 | 3700 |
| Dyno Testing |  |  |
| On Tester #1 (average life in hours) | 316 | 379 |
| On Tester #2 (average life in hours) | 43.4 | 68.4 |

Illustration II.

In a second test series, belt Comp. Ex. 3 and Ex. 4 were constructed with a polyester-based TPU belt body and woven nylon fabric on the tooth surface. These toothed belts were endless with a metric T10 profile (10 mm pitch, and trapezoidal tooth shape) and cut to a width of 25 mm. Comp. Ex. 3 was constructed with a conventional steel cord, and Ex. 4 used the same inventive cord of Ex. 2 above. Specimens of these two belts were subjected to a cord adhesion test, the results of which are shown in Table 3. Table 3 shows that the inventive treated cord in Ex. 4 has equal or better adhesive performance than the conventional cord used in Comp. Ex. 3, demonstrating that an embodiment of the invention is suitable for use in TPU belts.

TABLE 3

|  | Comp. Ex. 3 | Ex. 4 |
|---|---|---|
| Cord adhesion (N) | 977.1 | 1060.4 |
| Failure mode | Cord break | Adhesive |

Illustration III.

For this series, Torayca T700GC 41E 12 k-1 yarns were used to make 8-mm pitch toothed, cast PUU belts as in Illustration I. Control belts made with greige, twisted cord are referred to as Comp. Ex. 5. A portion of the cord was treated according to another embodiment of the present invention and then used to make a slab of inventive 8-mm pitch toothed belts, referred to herein as Ex. 6. The PUU adhesive treatment of Ex. 6 comprised a polyester/TDI prepolymer, with a MEKO blocking agent on the isocyanate groups. The curative was the diamine, DETDA. The liquid mixture of blocked prepolymer and curative was impregnated into the carbon fiber bundle under pressure, though use of a solvent as described above would have been easier. The belts were again evaluated for tensile decay on the Flex Conditioning test, but at 150 pounds dead weight tension, and for handling damage by both back-bending and forward bending on pipes of various diameters. The results are shown in Table 4. It can be seen that this embodiment also exhibits improved handling resistance over the control. In another example of using a blocked prepolymer, designated Ex. 7, the curative was the diamine, MCDEA, but no belt data is available.

TABLE 4

| Belt Tensile Strength Tests (lbf/inch belt width) | Comp. Ex. 5 | Ex. 6 |
|---|---|---|
| Initial Tensile Strength | 12100 | 10100 |
| Post Flex Conditioning (2 hrs.) | 8800 | 10100 |
| Post Flex Conditioning (24 hrs.) | 8600 | 10200 |
| Post Flex Conditioning (48 hrs.) | 8000 | 10200 |
| Post Flex Conditioning (190 hrs.) | 8000 | 9900 |
| After back bends at 50-mm diameter | 5800 | 10300 |
| After front bends at 37-mm diameter | 5500 | 10600 |

Illustration IV.

Figure 4:
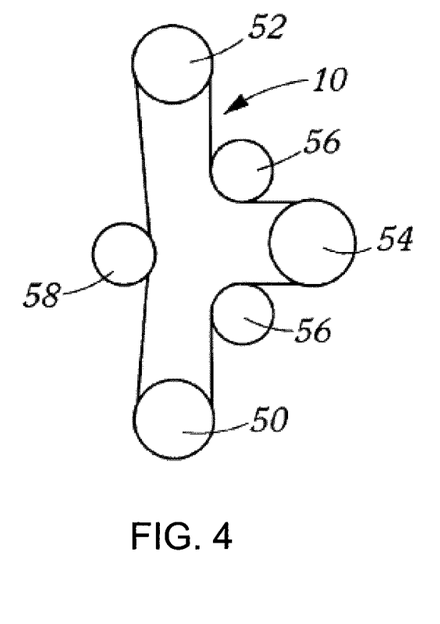
FIG. 4 is a schematic of a flexibility test used to test a characteristic of a belt embodiment of the invention.

In this set of examples, an embodiment using PUU-treated carbon cord is compared to a conventional RFL-treated carbon cord in a rubber, toothed belt. A 12 k-1 carbon bundle was again PUU treated as in Ex. 2 of Illustration I, but in addition, the treated cord was dipped in a Cilbond 81 overcoat adhesive and dried again. For a control, an X-HNBR-RFL treated 12 k cord was prepared according to the methods of U.S. Pat. No. 6,695,733 (see Table 1 therein and associated text, which is hereby incorporated herein by reference), and also overcoated with Cilbond 81. Toothed belts were made according to well-known methods, including applying a nylon fabric sleeve to a 97-groove (9.525-mm pitch) mandrel, helically winding both S and Z twisted cords at 18 total strands per inch giving suitable spacing to allow rubber to flow through, applying a layer of sulfur-cured HNBR rubber, and curing under pressure and temperature so that the rubber flows through the cord, presses the fabric into the grooves and forms the teeth, as the composite is cured. After removal of the resulting sleeve from the mandrel, individual belts were cut to 19 mm width. The control belts with RFL-treated cord are designated Comp. Ex. 8, and the inventive belts with PUU-treated cord are designated Ex. 9. A number of belt tests were conducted and the results are shown in Table 5. The tensile strength was measured as previously described, as was cord adhesion. The jacket adhesion test involved peeling the tooth fabric off the belt, giving a minimum in the web region where jacket-cord adhesion is primarily measured and a maximum in the tooth region where jacket-rubber adhesion is primarily measured. The belt running temperature was measured over a 24 hour period on a no-load Flex Test rig. The Flex Test is illustrated in FIG. 4. A 97-tooth synchronous belt was run on a driving pulley 50 with 19 grooves, two driven pulleys 52 and 54, with 19 grooves and 20 grooves respectively, two backside idlers 56 (50-mm diameter) and a tensioner 58. A tension of 200 N was applied with tensioner 58 by a hanging weight. The Flex Test ran at 6200 rpm at room temperature.

Table 5 shows that the rubber belts according to the invention perform comparably to the control belts. It was noted that in some cases, the original inventive belts tested inferior to the control, while the air aged inventive belts were comparable, e.g., on the cord adhesion test and the dynamic tooth durability test. This is believed due to the slow cure of the PUU material and indicates a possible advantageous use of a post-cure treatment or addition of a catalyst to the adhesive, for some embodiments of the invention. On the Flex Test rig, the inventive PUU-treated cord resulted in lower belt running temperatures than RFL-treated cord, which is believed attributable to improved dynamic properties of PUU over RFL.

TABLE 5

|  | Comp. Ex. 8 | | Ex. 9 | |
| --- | --- | --- | --- | --- |
|  | Original | Air Aged | Original | Air Aged |
| Tensile Strength (kN/20 mm) | 43 | 44.5 | 31.5 | 32.5 |
| Cord Adhesion (N) | 1050 | 1200 | 650 | 1050 |
| Jacket-Cord (Web) Adhesion (N) | 28 | 26 | 26.5 | 25 |
| Jacket-Tooth Adhesion (N) | 140 | 110 | 100 | 110 |
| Belt Running Temperature (° C.) | 112 | 108 | — | 102 |
| Dynamic tooth durability (cycles) | 3000 | 10000 | 300 | 100,000 |

Illustration V.

This series of examples is largely a repeat of Illustration I, but with 27.5% solids in the adhesive solution, variations in adhesive pickup levels, and with a variety of other carbon cord sizes, including a much larger, 12 k-4 carbon cord bundle twisted 1.2-1.3 turns per inch. A water dip after treatment was not used. As before, a portion of the greige, twisted cords (both S and Z) were used to make comparative cast-PUU, toothed belts according to the method of U.S. Pat. No. 5,807,194 to Knutson et al. As indicated in Table 6, the treated 12 k-4 carbon cords (made from the Toho 12 k yarns of Illustration I) were made into 14-mm-pitch HTD®-profile belts. The 14-mm belts of this illustration utilized the same cast PUU resin formulation for the belt body as in Illustration I above, i.e., a TDI-terminated polyether prepolymer based on PTMEG, cured with TMGDAB. As shown in Table 6, the 12 k-4 cords of Ex. 11 and 12 showed improved tensile strength over the greige cords of Comp. Ex. 10. The increase in stiffness relative to the 12 k-1 cords of Illustration I is commensurate with the increased cord diameter. The increase in tensile strength of the cords after treatment is comparable to that observed above in Illustration I. The dip pickups ranged from 10.3 to 14% for this run of 12 k-4 cord. Finally, note that the handling testing for the belts of Ex. 11 and 12 again shows dramatic improvements in tensile strength retained after back bending over pulleys of decreasing size, relative to the Comp. Ex. 10.

TABLE 6

|  | Comp. Ex. 10 | Ex. 11 | Ex. 12 |
| --- | --- | --- | --- |
| Carbon Cord Construction | 12k-4 | 12k-4 | |
| Solids Pick Up (S, Z) (%) | — | 11, 12.8 | |
| Tensile Strength (avg.) (lb) | 530 | 926 | |
| Stiffness (S, Z) (lbf, after 23 d) | — | 6.17, 6.22 | |
| Belt Tensile Strength Tests (14-mm HTD) (lbf/inch belt width) | Made in Cell 3 | Cell 3 | Cell 1 |
| Initial Tensile Strength (inverted on 102-mm diameter pulleys) | 21308 | 20469 | 17657 |
| After back bends at 43-mm diameter | 11441 | 16526 | 16763 |
| After back bends at 33-mm diameter | 8159 | 13930 | 15284 |
| After back bends at 28-mm diameter | 5735 | 11632 | 14480 |

The results shown in Table 7 indicate that the invention is applicable to making a range of cord sizes, in this illustration from 12 k-1 to 18 k-1. The results of Table 7 also show a wide range of solids pickup values for the resulting cords, from 6.2% to 17%. In each case, the inventive example cord shows significant improvements in tensile strength over the greige cord, which is most likely indicative of improved handling in the tensile test. It is also noteworthy that the tensile strength of the inventive cords was independent of the solids pickup level, so a single average value is reported for both S and Z cords. Cord stiffness appears to increase with cord size and with solids pickup.

TABLE 7

|  | Comp. Ex. 13 | Ex. 14 | Comp. Ex. 15 | Ex. 16 | Comp. Ex. 17 | Ex. 18 | Comp. Ex. 19 | Ex. 20 |
| --- | --- | --- | --- | --- | --- | --- | --- | --- |
| Carbon Cord Construction | Toho 12k-1 | Toho 12k-1 | Grafil 12k-1 | Grafil 12k-1 | Grafil 15k-1 | Grafil 15k-1 | Grafil 18k-1 | Grafil 18k-1 |

TABLE 7-continued

|  | Comp. Ex. 13 | Ex. 14 | Comp. Ex. 15 | Ex. 16 | Comp. Ex. 17 | Ex. 18 | Comp. Ex. 19 | Ex. 20 |
|---|---|---|---|---|---|---|---|---|
| Solids Pick Up (S, Z) (%) | — | 6.2, 17 | — | 8.8, 12 | — | 7.8, 14.9 | — | 6.2, 15.7 |
| Tensile Strength (avg.) (lb) | 157 | 281 | 149 | 274 | 216 | 329 | 230 | 380 |
| Stiffness (S, Z) (lbf, after 23 days) | — | 0.77, 1.27 | — | 0.91, 1.07 | — | 1.09, 1.64 | — | 1.1, 1.77 |

Microscopy was performed on various of the cord examples as prepared and on belt cross sections after casting or forming. The outside of the inventive cord is generally free of a polymeric skin. The outer fibers of the cord generally appear to be well coated with PUU, but not necessarily bound together, but neither are the outer fibers likely to fly away or fray upon cutting the cord. The inside of the cord is generally very well penetrated with PUU adhesive, but not necessarily totally filled. The belt body material in the cast urethane belts is generally able to penetrate the treated cord and almost completely fill the remaining interstices. This is believed to provide excellent physical or mechanical adhesion, as well as chemical adhesion. Depending on treatment conditions, the treated cord may not be as circular in cross section as the greige cord due to the drying and polymerization or curing of the treated cord on a spool. Thus, the invention cord may have flats formed where it sits upon previous layers of cord due to winding on a spool.

Embodiments of the invention exhibit a number of advantages over the prior art. The invention eliminates cord fraying during cutting and provides improvements in belt tensile strength, belt bending endurance, and resistance to handling damage. Generally, other physical properties of the belt, related to belt performance, have not been negatively impacted by the invention. For example, in the case of cast PU belts, flex fatigue resistance and load life capacity of belts of the invention are as good or slightly better than belts produced from greige cord. Similar advantages should be realized in other reinforced elastomer applications such as those listed and/or illustrated previously herein.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A power transmission belt comprising: an elastomeric body, and a twisted tensile cord embedded in the elastomeric body;
    with the tensile cord impregnated with a crosslinked polyurea-urethane composition different from said elastomeric body comprising the polyurea reaction product of:
    a polyurethane prepolymer; and
    a curative selected from the group consisting of diamines and water.

2. The belt of claim 1 wherein said prepolymer comprises the reaction product of a diisocyanate and one or more polyols selected from the group consisting of polyester polyols, polycarbonate polyols and polyether polyols; and wherein said curative is water.

3. The belt of claim 2 wherein said diisocyanate is selected from the group consisting of para-phenylene diisocyanate, toluene diisocyanate, and 4,4'-methylene diphenyl diisocyanate.

4. The belt of claim 3 wherein said one or more polyols is selected from the group consisting of polycarbonate polyols and polycaprolactone polyols.

5. The belt of claim 4 wherein said one or more polyols comprises a mixture of a diol and a triol.

6. The belt of claim 5 wherein said tensile cord comprises a filament yarn with interstices between fibers and said composition impregnates at least a portion of said interstices and coats said fibers.

7. The belt of claim 6 wherein said impregnated portion is from about 20% to about 100% of the volume of the interstices.

8. The belt of claim 5 wherein said tensile cord comprises a yarn comprising a plurality of carbon fibers with interstices between said carbon fibers, and wherein said composition impregnates from 20% to 100% of the volume of said interstices and coats said carbon fibers.

9. The belt of claim 1 wherein said prepolymer comprises the reaction product of para-phenylene diisocyanate and one or more polycaprolactone polyols; and wherein said curative comprises water.

10. The belt of claim 1 wherein said composition consists essentially of the polyurea reaction product of:
    the polyurethane prepolymer; and
    water.

11. The belt of claim 1 wherein said elastomeric body comprises cast polyurethane elastomer, and said elastomer is in intimate contact with said composition.

12. The belt of claim 11 wherein said tensile cord comprises a yarn comprising a plurality of carbon fibers with interstices between said carbon fibers, and wherein said composition impregnates from 20% to 99% of the volume of said interstices and coats said carbon fibers; and wherein said elastomer impregnates at least a portion of the remainder of said interstices.

13. The belt of claim 1 wherein said elastomeric body comprises vulcanized rubber.

14. The belt of claim 13 wherein said tensile cord comprises an overcoat adhesive layer disposed between said polyurea-urethane composition and said vulcanized rubber.

15. The belt of claim 1 wherein said elastomeric body comprises a thermoplastic elastomer and said elastomer is in intimate contact with said polyurea-urethane composition.

16. The belt of claim 15 wherein said elastomer is a thermoplastic polyurethane.

17. The belt of claim 16 wherein said belt has a first end and a second end.

18. The belt of claim 1 wherein said belt is an endless, power transmission belt.

19. The belt of claim 18 wherein said belt is a toothed belt.

20. A twisted tensile cord wound on a spool for subsequent use in reinforcing an elastomeric article; with at least a portion of said cord impregnated with a crosslinked polyurea-urethane composition comprising the reaction product of:
a polyurethane prepolymer comprising the reaction product of a polyisocyanate and at least one polyol selected from polyester polyols, polycarbonate polyols, and polyether polyols; and
a chain extender selected from diamines and water.

21. The tensile cord of claim 20 wherein said polyol is selected from the group consisting of polycarbonate polyols and polycaprolactone polyols and includes a mixture of a diol and a triol; said polyisocyanate is selected from the group consisting of para-phenylene diisocyanate, 2,6-toluene diisocyanate, and 4,4'-diphenyl methane diisocyanate; and said chain extender is water.

22. The tensile cord of claim 21 wherein said tensile cord comprises a filament yarn comprising a plurality of carbon fibers with interstices between said carbon fibers, and wherein said composition impregnates from 20% to 99% of the volume of said interstices and coats said carbon fibers.

23. A method comprising:
mixing a dip comprising a polyurethane prepolymer in an inert non-aqueous solvent;
dipping a filament yarn in said dip;
drying said dipped filament yarn to remove said solvent; and
curing to some degree said prepolymer in the presence of water;
whereby is provided a tensile cord at least partially impregnated with a crosslinked polyurea-urethane composition; and
embedding said tensile cord in an elastomeric power transmission belt body.

24. The method of claim 23 wherein said elastomeric power transmission belt body is of a second polyurea-urethane composition of a different composition than said crosslinked polyurea-urethane composition.

25. The method of claim 23 further comprising:
wherein said filament yarn is of carbon fiber in twisted form, and
whereby said tensile cord is a twisted tensile cord.

26. The method of claim 23 further comprising:
twisting said dipped filament yarn; and
whereby said tensile cord is a twisted tensile cord.

27. The tensile cord of claim 20 wherein the curative is diamine, and the polyurethane prepolymer has isocyanate end groups that are blocked.

28. The belt of claim 1 wherein the curative is diamine, and the polyurethane prepolymer has isocyanate end groups that are blocked with a blocking agent.

29. A method comprising:
mixing in an inert non-aqueous solvent a dip comprising:
a polyurethane prepolymer with blocked isocyanate end groups, and a polyamine curative;
dipping a filament yarn in said dip;
drying said dipped filament yarn to remove said solvent; and
curing to some degree said prepolymer;
whereby is provided a tensile cord at least partially impregnated with a crosslinked polyurea-urethane composition; and
embedding said tensile cord in an elastomeric power transmission belt body.

30. The method of claim 29 wherein said filament yarn comprises carbon fiber.

31. The method of claim 30 wherein said elastomeric belt body comprises a polyurethane elastomer different in composition from said crosslinked polyurea-urethane composition.

* * * * *